United States Patent
Coutandin

(10) Patent No.: US 6,810,672 B2
(45) Date of Patent: Nov. 2, 2004

(54) GAS TURBINE COMBUSTOR, PARTICULARLY FOR AN AIRCRAFT ENGINE

(75) Inventor: Daniele Coutandin, Turin (IT)

(73) Assignee: Fiatavio S.p.A., Turin (IT)

( * ) Notice: Subject to any disclaimer, the term of this patent is extended or adjusted under 35 U.S.C. 154(b) by 12 days.

(21) Appl. No.: 10/118,327

(22) Filed: Apr. 9, 2002

(65) Prior Publication Data

US 2002/0162331 A1 Nov. 7, 2002

(30) Foreign Application Priority Data

Apr. 10, 2001 (IT) ..................................... TO2001A0346

(51) Int. Cl.$^7$ .............................. F02C 1/00; F02G 3/00
(52) U.S. Cl. .............................. 60/752; 60/756; 60/757
(58) Field of Search .......................... 60/752, 756, 757, 60/799

(56) References Cited

U.S. PATENT DOCUMENTS

| 2,699,648 | A |   | 1/1955  | Berkey .................... 60/39.65 |
|-----------|---|---|---------|--------------------------------------|
| 3,572,031 | A |   | 3/1971  | Szetela ..................... 60/39.65 |
| 3,738,106 | A |   | 6/1973  | Stein et al. ................ 60/39.23 |
| 3,742,703 | A |   | 7/1973  | Melconian ................. 60/39.32 |
| 4,555,901 | A | * | 12/1985 | Wakeman et al. ............ 60/796 |
| 4,561,257 | A | * | 12/1985 | Kwan et al. ................. 60/737 |
| 4,614,082 | A | * | 9/1986  | Sterman et al. ............... 60/796 |
| 4,896,510 | A | * | 1/1990  | Foltz ........................... 60/757 |
| 4,912,922 | A | * | 4/1990  | Maclin ........................ 60/796 |
| 5,237,813 | A | * | 8/1993  | Harris et al. .................. 60/804 |
| 5,628,193 | A | * | 5/1997  | Kington et al. ............... 60/752 |
| 6,079,199 | A | * | 6/2000  | McCaldon et al. ........... 60/800 |

FOREIGN PATENT DOCUMENTS

| DE | 953928  | 12/1956 |
|----|---------|---------|
| EP | 0937946 | 8/1999  |
| GB | 698539  | 10/1953 |

OTHER PUBLICATIONS

Patent Abstracts of Japan, "Low Nox Gas Turbine Combustor", vo. 008, No. 197, Sep. 11, 1984 & JP 59086823, May 19, 1984.

* cited by examiner

Primary Examiner—Charles G. Freay
Assistant Examiner—William H. Rodriguez
(74) Attorney, Agent, or Firm—Shlesinger, Arkwright & Garvey LLP

(57) ABSTRACT

A gas turbine combustor, in particular for an aircraft engine, has at least one chamber, through which combustion gas flows in use, and which is defined by a lateral wall with channeling for feeding cooling air into the chamber and cooling the lateral wall; part of the channeling is defined by at least one double wall for guiding a relative stream of cooling air into the chamber in a tangential direction with respect to the lateral wall.

8 Claims, 1 Drawing Sheet

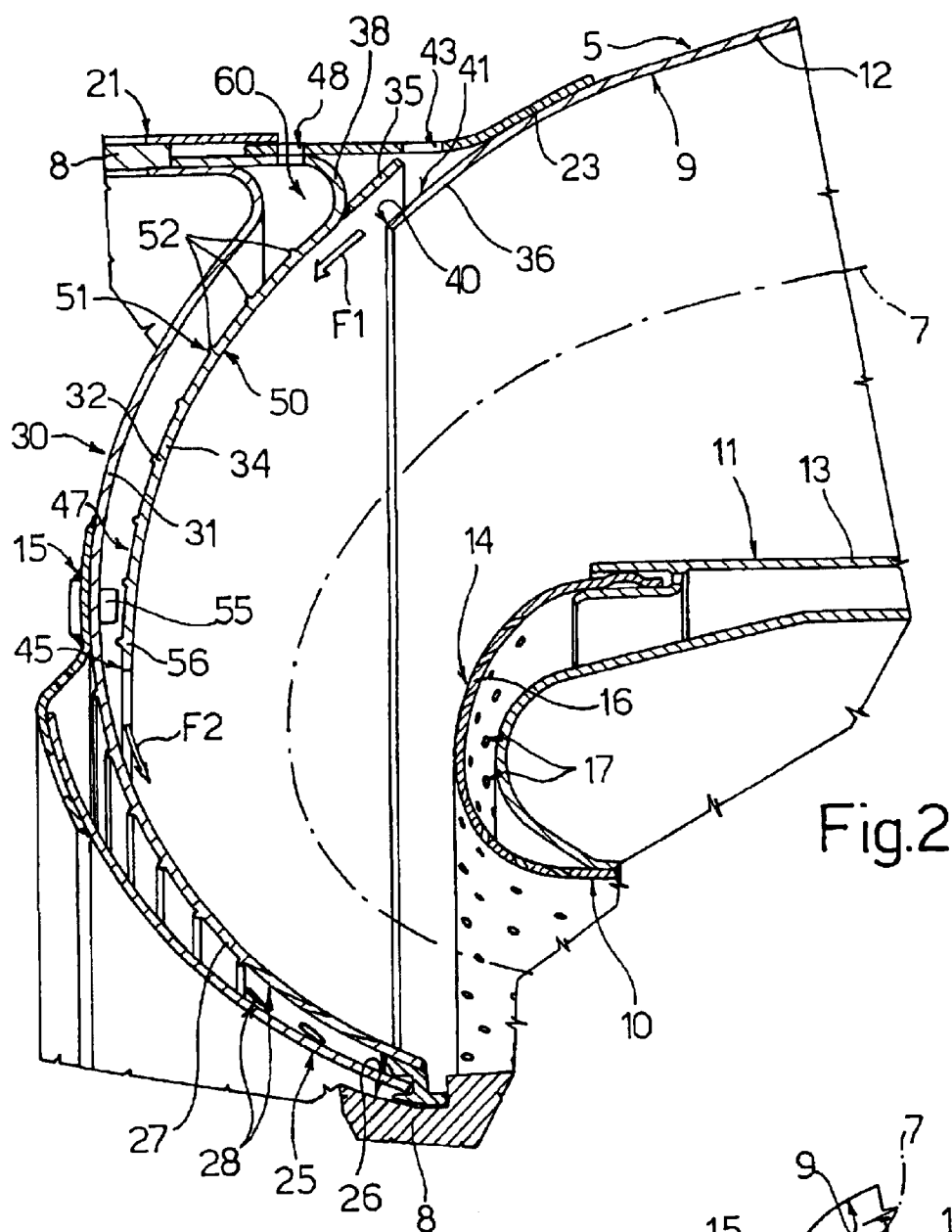
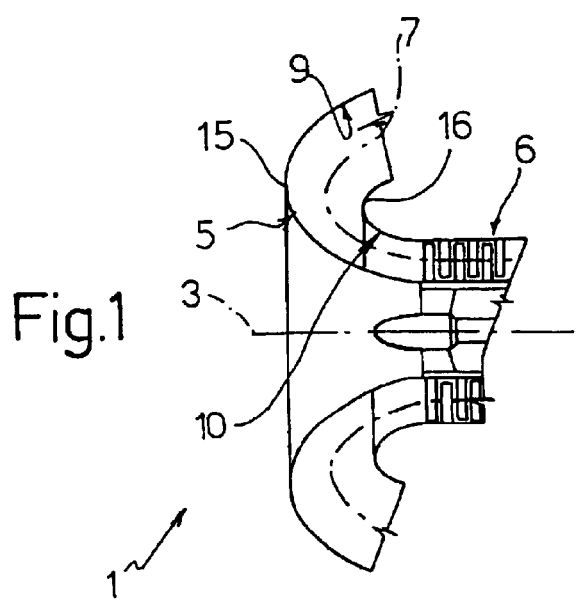
Fig.2
Fig.1

GAS TURBINE COMBUSTOR, PARTICULARLY FOR AN AIRCRAFT ENGINE

The present invention relates to a gas turbine combustor, particularly for an aircraft engine.

BACKGROUND OF THE INVENTION

As is known, jet aircraft engines comprise a compressor; an expansion turbine; and a combustor interposed between the compressor and the turbine. The combustor comprises a combustion chamber communicating with the compressor outlet; and a turbine inlet chamber or conduit, along which, in use, flows relatively high-temperature gas generated inside the combustion chamber.

To reduce thermal stress caused by the high gas temperature, the inner walls defining the turbine inlet conduit and the combustion chamber must be cooled continually; for which purpose, the inner walls have a number of through holes, through which relatively low-temperature air flows crosswise to the inner walls into the conduit where it mixes directly with the gas flowing towards the turbine.

Known combustors of the above type are unsatisfactory by requiring a relatively large amount of air to cool the inner walls as required, and which is mainly due to inefficient heat exchange between the inner walls and the airflow through the holes formed in the inner walls.

Moreover, the holes produce stress concentrations in the material in which they are formed, and so tend to impair the mechanical strength of the inner walls of the combustor.

SUMMARY OF THE INVENTION

It is an object of the present invention to provide a gas turbine combustor, particularly for an aircraft engine, designed to provide a straightforward, low-cost solution to the above problems, and which in particular provides for improving heat exchange between the cooling air and the inner walls.

According to the present invention, there is provided a gas turbine combustor, in particular for an aircraft engine; the combustor comprising at least one chamber, through which combustion gas flows in use; at least one lateral wall defining said chamber; and channeling means associated with said lateral wall to permit the passage of a cooling fluid for cooling the lateral wall; and being characterized by also comprising guide means at least partly defining said channeling means to feed at least one stream of said cooling fluid into said chamber in a tangential direction with respect to said lateral wall.

BRIEF DESCRIPTION OF THE DRAWINGS

A non-limiting embodiment of the invention will be described by way of example with reference to the accompanying drawings, in which:

FIG. 1 shows a schematic, partial diametrical section of a preferred embodiment of the gas turbine combustor, particularly for an aircraft engine, according to the present invention;

FIG. 2 shows a larger-scale, diametrical half-section of the FIG. 1 combustor.

DETAILED DESCRIPTION OF THE INVENTION

Number 1 in FIG. 1 indicates as a whole a jet aircraft engine, which is axially symmetrical with respect to an axis 3, and comprises a compressor (not shown), a combustor 5 (shown partly), and a turbine 6 (shown partly and schematically), arranged in series with one another along a gas-flow path 7 through engine 1.

With particular reference to FIG. 2, combustor 5 comprises a supporting structure 8 (shown partly), and defines an inner annular cavity 9 having an inlet (not shown) communicating with the outlet of the compressor, and an outlet 10 communicating with the inlet of turbine 6. Cavity 9 comprises a combustion chamber 11 (shown partly) defined by two facing walls 12 and 13; and an annular chamber 14 formed in an intermediate position between chamber 11 and outlet 10 to feed the gas into turbine 6.

Chamber 14 decreases gradually in section towards outlet 10 to accelerate flow of the gas, and is defined by two facing walls 15 and 16 having a curved diametrical section and converging with each other towards outlet 10. Wall 16 is convex towards chamber 14, forms an extension of wall 13, and has a number of holes 17 by which streams of cooling air flow through wall 16.

Wall 15, on the other hand, is defined by an annular structure comprising a fastening end portion 21 (shown partly), which extends outwards of cavity 9 and is connected, on one side, to structure 8 in known manner not shown in detail, and, on the other side, to wall 12 by means of an annular flange 23 integral with wall 12. Portion 21 is connected to structure 8 and to flange 23 to allow structure 15 a relatively small amount of axial and radial movement to compensate, in use, for high-temperature-gradient deformation.

Again to compensate for high-temperature-gradient deformation, structure 15 also comprises an annular end portion 25 facing outlet 10 and connected to structure 8 to slide along a curved guide 26 (shown partly) substantially parallel to path 7.

More specifically, portion 25 comprises a wall 27, which defines and is concave towards chamber 14, and which has a number of holes 28 for the passage of cooling air streams through wall 27.

Structure 15 also comprises an intermediate portion 30 between portions 21 and 25, and comprising two annular walls 31 and 32, which extend facing each other and spaced apart along path 7, with their respective concavities facing chamber 14. Wall 31 is a seamless extension of wall 27, whereas wall 32 defines chamber 14 and comprises two opposite panels 34 and 35 respectively facing wall 31 and an end portion 36 of wall 12. Panels 34 and 35 project from an intermediate fastening portion 38, which is integral with portion 21 and U-shaped with its concavity facing panel 34.

Panel 35 and portion 36 define an annular opening 40 formed in an ideal surface perpendicular to path 7; and an annular guide channel 41, which is substantially parallel to path 7, communicates with a cooling air inlet 43 formed in flange 23, and comes out inside chamber 14 through opening 40.

Panel 34 and wall 31, on the other hand, converge with each other towards outlet 10, and define an annular opening 45 formed in an ideal surface perpendicular to path 7; and an annular guide channel 47, which is substantially parallel to path 7, communicates with a cooling air inlet 48 formed in portion 38, and comes out inside chamber 14 through opening 45.

More specifically, panel 34 has a substantially smooth surface 50 defining chamber 14; and a surface 51 defining channel 47 and having circumferential ribs 52.

With reference to FIG. 2, portion 30 comprises a number of stop members carried by wall 31, angularly spaced about axis 3, and only one of which is shown and indicated 55 in FIG. 2. Member 55 projects inside channel 47, is detached from surface 51, and defines a stop for the free end 56 of panel 34 when free end 56 moves towards wall 31.

In actual use, panels 34, 35 and portion 36 of wall 12 define channels 41 and 47, and guide two cooling air streams F1 and F2 into chamber 14 in respective directions tangential with respect to structure 15, and, more specifically, in directions concordant with each other and with gas-flow path 7. As they flow along structure 15, streams F1, F2 cool structure 15 and gradually mix with the combustion gas flowing in chamber 14. More specifically, stream F1 flows tangentially with respect to wall 32, while stream F2 is accelerated along channel 47 by the gradually narrowing section of channel 47, flows into chamber 14 tangentially with respect to wall 31, and flows along wall 27 together with stream F1.

At the same time, free end 56 is movable crosswise to wall 31 and path 7 to vary the flow section of opening 45 and channel 47 as a function of the structure 15 determined by the gas temperature, and is moved by the deformation of panel 34 and U-shaped portion 38 caused by the temperature gradient of various operating conditions. More specifically, as temperature increases, panel 34 moves automatically towards wall 31, so that the section of opening 45 and channel 47 narrows to increase the speed of stream F2.

The increase in the speed of stream F2 increases the amount of heat removed from, and so reduces the temperature of, structure 15, so that free end 56 moves away from wall 31 to reduce the speed of stream F2 and, therefore, the amount of heat removed. In the steady operating condition of combustor 5, the position of panel 34 settles after a number of cycles, so that the flow sections of opening 45 and channel 41 reach a balance condition.

In combustor 5 described and illustrated, channels 41, 47 and openings 40, 45 therefore form part of a channeling system 60, which provides for cooling structure 15 with greater heat-exchange efficiency than by feeding cooling air through holes formed crosswise to structure or wall 15.

Streams F1, F2, in fact, are guided tangentially with respect to the surfaces defining chamber 14, so that heat exchange between the cooling air and wall or structure 15 takes place over a relatively wide area.

Consequently, a much smaller amount of air is needed to keep structure 15 below a given required temperature: in particular, roughly half the amount required using a structure 15 simply provided with through holes.

Moreover, heat-exchange efficiency is also improved by providing a first and second stream F1, F2 flowing successively in concordant directions, and the effects of which are combined at the point in which cooling by stream F1 tends to become less effective. The way in which the two successive streams F1, F2 are provided is also extremely straightforward, by one wall 32 defining both openings 40, 45.

Adjusting the speed of stream F2 by means of thermal deformation of panel 34 and portion 38 also provides for automatically regulating cooling of structure 15 as a function of temperature, and is achieved extremely easily by panel 34 projecting from portion 38.

Members 55 also provide for controlling the flow section of stream F2, in the sense of preventing full closure of opening 45.

Structure 15 also has good mechanical structural characteristics, by having substantially no through holes which would tend to weaken it.

Clearly, changes may be made to combustor 5 as described herein without, however, departing from the scope of the present invention.

In particular, openings 40, 45 and channels 41, 47 may differ from those described and illustrated, e.g. to direct streams F1, F2 in slightly different tangential directions, and/or with a circumferential component with respect to axis 3; and openings 40, 45, as opposed to being annular, may be formed along only part of the circumferential periphery of cavity 9.

The cooling fluid may be other than air; and/or more than two successive tangential streams may be provided along the periphery of chamber 14.

Finally, the present invention may also be applied to walls 16, 27 defining chamber 14, and/or to walls 12, 13 defining combustion chamber 11.

What is claimed is:

1. A gas turbine combustor for an aircraft engine, comprising:
   a) at least one chamber through which combustion gas flows in use;
   b) at least one lateral wall defining said chamber;
   c) a channel associated with said lateral wall to permit the passage of a cooling fluid for cooling said lateral wall;
   d) a guide at least partly defining said channel to feed at least one stream of the cooling fluid into said chamber in a tangential direction with respect to said lateral wall; and
   e) said guide decreasing in cross-section towards an inlet into said chamber.

2. A gas turbine combustor for an aircraft engine, comprising:
   a) at least one chamber through which combustion gas flows in use;
   b) at least one lateral wall defining said chamber;
   c) a channel associated with said lateral wall to permit the passage of a cooling fluid for cooling said lateral wall;
   d) first and second guides at least partly defining said channel to feed at least one stream of the cooling fluid into said chamber in a tangential direction with respect to said lateral wall;
   e) said first and second guides defining a first and a second inlet formed in respective spaced apart portions of said lateral wall to feed tangential, substantially concordant streams of cooling fluid into said chamber; and
   f) said first and second guides comprising a common wall.

3. A gas turbine combustor for an aircraft engine, comprising:
   a) at least one chamber through which combustion gas flows in use;
   b) at least one lateral wall defining said chamber;
   c) a channel associated with said lateral wall to permit the passage of a cooling fluid for cooling said lateral wall;
   d) a guide at least partly defining said channel to feed at least one stream of the cooling fluid towards an inlet into said chamber in a tangential direction with respect to said lateral wall;
   e) said guide comprising at least first and second walls forming part of said lateral wall; and
   f) one of said first and second walls including a substantially smooth surface defining said chamber and another surface defining said inlet, and said another surface including a plurality of ribs.

4. A gas turbine combustor as in claim 3, wherein said ribs are circumferential.

5. A gas turbine combustor for an aircraft engine, comprising:
   a) at least one chamber through which combustion gas flows in use;
   b) at least one lateral wall defining said chamber;
   c) a channel associated with said lateral wall to permit the passage of a cooling fluid for cooling said lateral wall;
   d) first and second guides at least partly defining said channel to feed first and second streams of the cooling fluid into said chamber in a tangential direction with respect to said lateral wall;
   e) said first and second guides defining first and second inlets, respectively, to feed the first and second streams, respectively, into said chamber; and
   g) each of said first and second inlets being defined by a respective annular opening about an axis of said combustor.

6. A gas turbine combustor for an aircraft engine, comprising:
   a) at least one chamber through which combustion gas flows in use;
   b) at least one lateral wall defining said chamber;
   c) a channel associated with said lateral wall to permit the passage of a cooling fluid for cooling said lateral wall;
   d) a guide at least partly defining said channel to feed at least one stream of the cooling fluid into said chamber in a tangential direction with respect to said lateral wall;
   e) said guide comprising at least first and second walls forming part of said lateral wall;
   f) one of said first and second walls comprising a fastening portion and a panel partly defining said inlet; and
   g) said fastening portion being U-shaped with its concavity facing said panel.

7. A gas turbine combustor for an aircraft engine, comprising:
   a) at least one chamber through which combustion gas flows in use;
   b) at least one lateral wall defining said chamber;
   c) means associated with said lateral wall for permitting the passage of first and second streams of cooling fluid for cooling said lateral wall; and
   d) said means including first and second inlets partly formed in succession along a path of the gas to feed tangential, substantially concordant said first and second streams of cooling fluid into said chamber;
   e) a guide at least partly defining said means to feed at least one of the first and second streams of the cooling fluid toward one of said first and second inlets into said chamber in a tangential direction with respect to said lateral wall;
   f) said guide comprising at least first and second walls forming part of said lateral wall; and
   g) one of said first and second walls being deformable as a function of temperature to reduce the section of one of said first and second inlets automatically alongside an increase in the temperature of said lateral wall to adjust the speed of the stream through said one of said first and second inlets.

8. A gas turbine combustor for an aircraft engine, comprising:
   a) at least one chamber through which combustion gas flows in use;
   b) at least one lateral wall defining said chamber;
   c) means associated with said lateral wall for permitting the passage of first and second streams of cooling fluid for cooling said lateral wall;
   d) said means including first and second inlets partly formed in succession along a path of the gas to feed tangential, substantially concordant said first and second streams of cooling fluid into said chamber;
   e) a guide at least partly defining said means to feed at least one of the first and second streams of the cooling fluid towards one of said first and second inlets into said chamber in a tangential direction with respect to said lateral wall;
   f) said guide comprising at least first and second walls forming part of said lateral wall;
   g) one of said first and second walls comprising a fastening portion and a panel partly defining said one of said first and second inlets; and
   h) one of said fastening portion and said panel being deformable as a function of temperature to reduce the section of said inlet automatically alongside an increase in the temperature of said lateral wall to adjust the speed of the stream through said inlet.

* * * * *